(12) United States Patent
Payne et al.

(10) Patent No.: US 11,408,494 B2
(45) Date of Patent: Aug. 9, 2022

(54) CLUTCH ASSEMBLY

(71) Applicant: Schaeffler Technologies AG & Co. KG, Herzogenaurach (DE)

(72) Inventors: Matthew Payne, Glenmont, OH (US); Kolstin Hartzler, Norton, OH (US); John Ramsey, Mansfield, OH (US); Markus Steinberger, Sagamore Hills, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/140,478

(22) Filed: Jan. 4, 2021

(65) Prior Publication Data

US 2022/0213950 A1    Jul. 7, 2022

(51) Int. Cl.
*F16H 45/02* (2006.01)
*F16D 25/063* (2006.01)

(52) U.S. Cl.
CPC ........... *F16H 45/02* (2013.01); *F16D 25/063* (2013.01); *F16H 2045/0205* (2013.01)

(58) Field of Classification Search
None
See application file for complete search history.

(56) References Cited

U.S. PATENT DOCUMENTS

| | | |
|---|---|---|
| 9,309,956 B2 | 4/2016 | Lindemann et al. |
| 9,677,654 B2 | 6/2017 | Jewell |
| 9,810,302 B2 | 11/2017 | Sayre et al. |
| 2009/0071786 A1* | 3/2009 | Tsuboi ................... F16H 45/02 192/3.29 |
| 2017/0002908 A1* | 1/2017 | Saka .................... F16F 15/145 |

\* cited by examiner

*Primary Examiner* — Colby M Hansen
(74) *Attorney, Agent, or Firm* — Volpe Koenig

(57) ABSTRACT

A clutch assembly is disclosed herein. The clutch assembly includes a joint balance chamber positioned between a disconnect apply chamber and a torque converter clutch apply chamber. A torque converter assembly includes a charge pressure fluid circuit. A hub defines a passage between the charge pressure fluid circuit and the joint balance chamber, such that fluid from the torque converter assembly is provided to the joint balance chamber.

20 Claims, 3 Drawing Sheets

CLUTCH ASSEMBLY

FIELD OF INVENTION

The present disclosure relates to a clutch assembly.

BACKGROUND

Various configurations for clutch assemblies are well known. Clutch assemblies can vary depending on the number of hydraulic fluid pathways, which can influence other aspects of the structure of the clutch assembly. As the number of fluid pathways increase, it is generally necessary to modify the input shaft in order to define additional channels for the fluid. Due to the input shaft's geometry, only a limited number of fluid pathways can be implemented before the input shaft begins experiencing undesirable effects. For example, the input shaft may weaken if too many fluid pathways are drilled into the input shaft. Alternatively, other modifications which avoid weakening the input shaft are possible, but these modifications increase the cost and complexity of the input shaft, and are therefore less desirable.

It would be desirable to provide a clutch assembly that provides multiple hydraulic fluid pathways and avoids modifications that jeopardize the function of components within the clutch assembly.

SUMMARY

A clutch assembly is disclosed herein. The clutch assembly includes a first chamber configured to be in fluid communication with a first passage defined by an input shaft, and the first chamber is configured to supply fluid pressure to engage a disconnect clutch pack. The clutch assembly includes a second chamber configured to be in fluid communication with a second passage defined by the input shaft, and the second chamber is configured to supply fluid pressure to engage a torque converter clutch piston. A joint balance chamber is positioned between the first chamber and the second chamber. A torque converter assembly is also provided that includes a charge pressure fluid circuit. A hub defines a third passage between the charge pressure fluid circuit and the joint balance chamber, such that fluid from the torque converter assembly is provided to the joint balance chamber. The hub can also define a fluid pathway between the second passage of the input shaft and the second chamber.

In one embodiment, the third passage extends in an axial direction between the charge pressure fluid circuit and the joint balance chamber. In one aspect, the joint balance chamber includes (i) a first portion partially defined by a first piston, and (ii) a second portion partially defined by a torque converter clutch piston. The first piston partially defines the first chamber and the torque converter clutch piston partially defines the second chamber.

In one embodiment, the first chamber is a disconnect apply chamber, and the second chamber is a torque converter clutch apply chamber.

A balance dam can also be provided that partially defines the joint balance chamber. The balance dam defines a fourth passage that provides a fluid pathway from the joint balance chamber to a disconnect clutch pack. The disconnect clutch pack is positioned radially outward from the fourth passage. An electric motor is arranged radially outward from the disconnect clutch pack, and the electric motor is in fluid communication with the fourth passage defined by the balance dam.

In one aspect, the fourth passage is formed as a plurality of scallops on the balance dam. This passage can be configured to provide a fluid flow path toward the electric motor.

In one aspect, the input shaft is fluidly isolated from the joint balance chamber.

The third passage in the hub can be the only source of fluid to the joint balance chamber.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
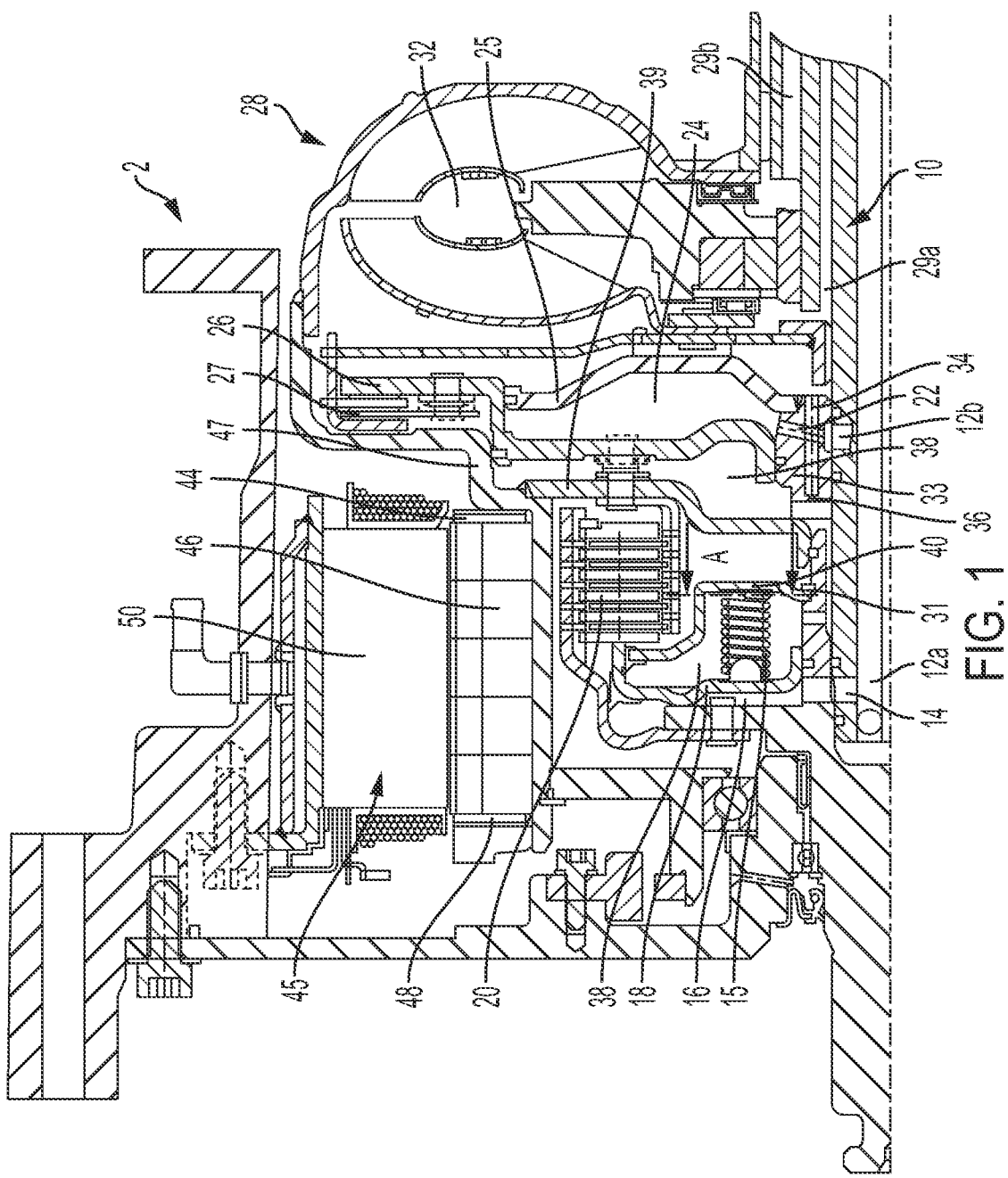
FIG. 1 is a side cross-sectional view of a clutch assembly.
Figure 2:
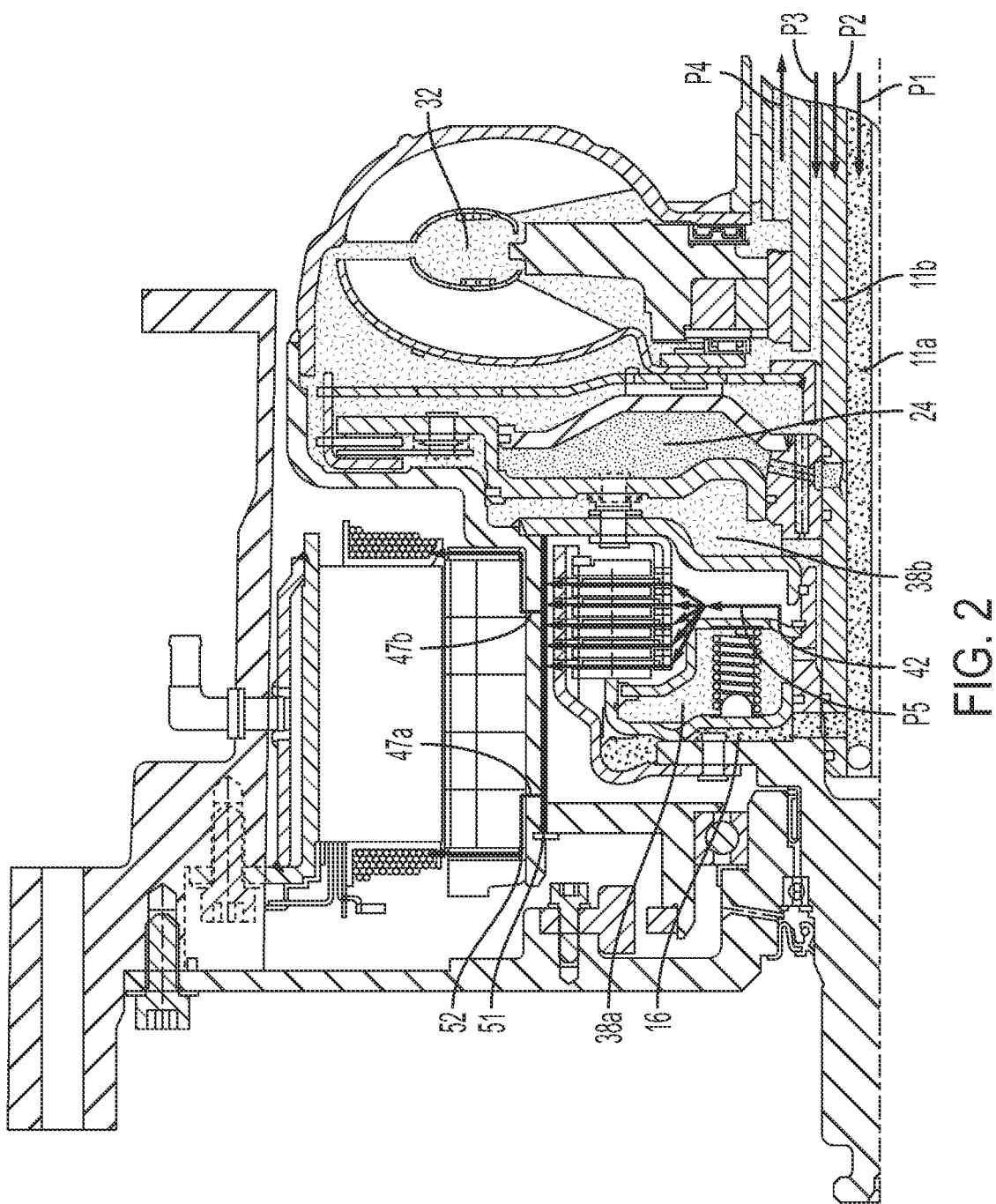
FIG. 2 is another side cross-sectional view of the clutch assembly of FIG. 1 illustrating additional aspects of the clutch assembly and flow paths.

A clutch assembly 2 is illustrated in FIGS. 1 and 2. As shown in the Figures, the clutch assembly 2 is configured to fluidly communicate with an input shaft 10. The input shaft 10 includes only two hydraulic fluid passages, and defines a first passage 12a connected to a first input shaft pathway 11a, and a second passage 12b connected to a second input shaft pathway 11b. The terms fluid and hydraulic fluid are used interchangeable herein. The passages 12a and 12b are shown as the outlets for pathways defined within the input shaft 10. The input shaft 10 only includes two pathways 11a, 11b and two passages 12a, 12b, and avoids issues, such as weakening, related to drilling additional pathways or passages in the input shaft. The pathways 11a, 11b are formed as axially extending passages, and the pathways 11a, 11b are arranged adjacent to each other in a radial direction.

A first chamber 16 is in fluid communication with the first passage 12a of the input shaft 10. In one embodiment, the first chamber 16 is also referred to as a disconnect apply chamber. The first chamber 16 is generally configured to supply fluid pressure to engage a disconnect clutch pack 20. The first chamber 16 is sealed such that the first chamber 16 is configured to displace a first piston 18 when pressure is applied. Chamber 38a is essentially a compensation chamber that balances the hydraulic effects of rotational motion.

In one aspect, a return spring 15 is arranged in the chamber 38a such that it engages the first piston 18 and a balance dam 40.

A second chamber 24 is in fluid communication with the second passage 12b of the input shaft 10. The second chamber 24 is also referred to as a torque converter clutch apply chamber. The second chamber 24 is configured to supply fluid pressure to engage a torque converter clutch piston 26. A sealing plate 25 defines an opposite side of the second chamber 24. The second chamber 24 is an apply chamber for a torque converter lock-up clutch 27 and is used to apply force to the torque converter lock-up clutch 27.

A joint balance chamber 38 is positioned between the first chamber 16 and the second chamber 24. The chamber 38 can be positioned axially between the first chamber 16 and the second chamber 24. The joint balance chamber 38 includes two portions 38a, 38b that are in fluid communication with each other but are spaced apart from each other. The first portion 38a is partially defined by the first piston 18. The first piston 18 also partially defines the first chamber 16. The second portion 38b is partially defined by a torque converter clutch piston 26 (which is part of the torque converter assembly 28 described in more detail herein) and a cover flange 39. The second portion 38b is essentially a torque converter lockup clutch balance chamber. The torque converter clutch piston 26 also partially defines the second chamber 24.

The torque converter assembly 28, also referred to as a torque converter clutch or TCC, is integrated with the clutch assembly 2. The TCC 28 includes a charge pressure fluid circuit 29a, 29b. As shown in FIG. 2, flow P3 provides charge pressure into the charge pressure fluid circuit 29a, 29b, and flow P4 provides an outlet for the charge pressure fluid circuit 29a, 29b. The TCC 28 also includes a torus 32. Flow P1 provides a KO apply pressure flow to the first chamber 16, and flow P2 provides TCC apply pressure flow to the second chamber 24. The flows P1, P2, P3, and P4 are shown with varying shading or patterns for illustrative purposes only and one skilled in the art would understand that the fluid can be the same type of fluid.

A hub 33 is provided and defines a third passage 34 between the charge pressure fluid circuit 29a, 29b and the joint balance chamber 38. The third passage 34 extends in an axial direction between the charge pressure fluid circuit 29a, 29b and the joint balance chamber 38. Based on the third passage 34, hydraulic fluid from the torque converter assembly 28 is provided to the joint balance chamber 38. The hub 33 can be mounted directly to an outer surface of the input shaft 10.

In one embodiment, the hub 33 defines a fluid pathway 22 between the second passage 12b of the input shaft 10 and the second chamber 24. An orifice 36 can be defined at the end of the passage 34 that defines the inlet into the joint balance chamber 38. The orifice 36 can be sized such that a controlled or reduced flow of hydraulic fluid from the charge pressure fluid circuit 29a, 29b is provided to the joint balance chamber 38. In one embodiment, the orifice 36 has a diameter of 3.0 mm-8.0 mm. One of ordinary skill in the art would recognize that this value can change depending on the specific parameters of a design.

A balance dam 40 is provided that partially defines the joint balance chamber 38, and more specifically defines the first portion 38a of the joint balance chamber 38. The balance dam 40 defines a fourth passage 42 that provides a fluid pathway (P5) from the joint balance chamber 38 through a disconnect clutch pack 20.

The disconnect clutch pack 20 is positioned radially outward from the fourth passage 42 and the disconnect clutch pack 20 defines a plurality of radially oriented passage. The clutch assembly 2 further comprises an electric motor 45 arranged radially outward from the disconnect clutch pack 20, and the electric motor 45 is in fluid communication with the fourth passage 42 defined by the balance dam 40. Fluid from the joint balance chamber 38 is centrifugally driven from the fourth passage 42 through the disconnect clutch pack 20 to a rotor carrier 47, which is configured to allow flow radially outward via multiple radial holes or openings 47a, 47b. As shown by pathway (P5), fluid is directed axially towards the engine or transmission via gaps 51, 52, and directed through respective radial grooves defined within end plates 44 (i.e. rotor carrier/TC cover) and 48, and ultimately to the stator 50 based on centrifugal acceleration. In other words, fluid is channeled to the electric motor 45, the rotor 46, end plates 44 and 48, and the stator 50 in order to cool these components.

Figure 3:
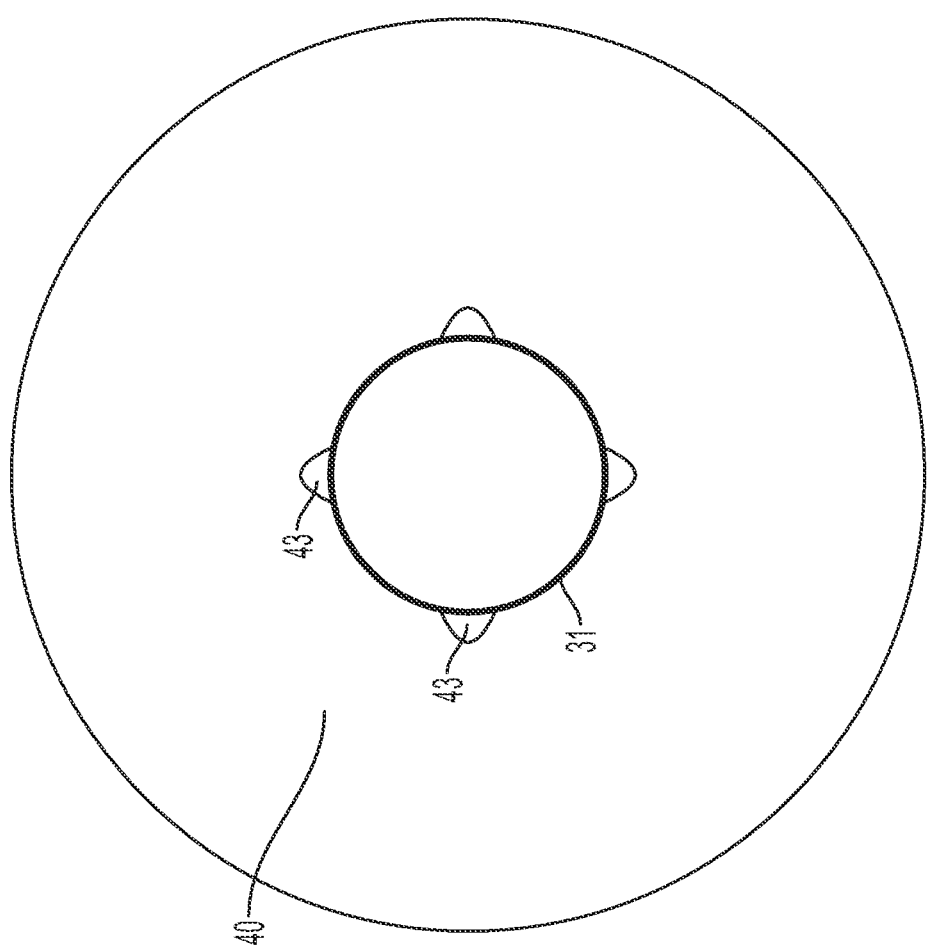
FIG. 3 is view of a hub through cross-sectional line A from FIG. 1.

In one embodiment, the fourth passage 42 is formed as a plurality of scallops 43 on the balance dam 40, as shown by FIG. 3. A snap ring 31 can also be provided to secure the balance dam 40.

The fourth passage 42 can be formed according to any number of ways, such as a plurality of openings circumferential spaced from each other.

In one aspect, the input shaft 10 is fluidly isolated from the joint balance chamber 38. In other words, the input shaft 10 does not have a fluid connection to the joint balance chamber 38.

In one aspect, the third passage 34 in the hub 33 (which is connected to the hydraulic fluid of the TCC 28) is the only source of fluid to the joint balance chamber 38.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS clutch assembly (2)
transmission input shaft (10)
first input shaft pathway (11a)
second input shaft pathway (11b)
first passage (12a)
second passage (12b)
cross drilled hole (14)
first chamber (16)
first piston (18)
disconnect clutch pack (20)
pathway (22)
second chamber (24)
sealing plate (25)

TCC piston (26)
torque converter lock-up clutch (27)
TCC assembly (28)
TCC circuit (29*a*, 29*b*)
stator shaft (30)
ring (31)
torus (32)
hub (33)
third passage (34)
orifice (36)
TCC joint balance chamber (38)
cover flange (39)
balance dam (40)
fourth passage (42)
scallops (43)
rotor carrier/TC cover (44)
electric motor (45)
rotor (46)
rotor carrier (47)
holes (47*a*, 47*b*)
end plate (48)
e-motor stator (50)
axial gaps (51, 52)

What is claimed is:

1. A clutch assembly comprising:
   a first chamber configured to be in fluid communication with a first passage defined by an input shaft, the first chamber configured to supply fluid pressure to engage a disconnect clutch pack;
   a second chamber configured to be in fluid communication with a second passage defined by the input shaft, the second chamber configured to supply fluid pressure to engage a torque converter clutch piston;
   a joint balance chamber positioned between the first chamber and the second chamber;
   a torque converter assembly including a charge pressure fluid circuit; and
   a hub defining a third passage between the charge pressure fluid circuit and the joint balance chamber, such that fluid from the torque converter assembly is provided to the joint balance chamber.

2. The clutch assembly of claim 1, wherein the third passage extends in an axial direction between the charge pressure fluid circuit and the joint balance chamber.

3. The clutch assembly of claim 1, wherein the joint balance chamber includes:
   a first portion partially defined by a first piston, the first piston also partially defining the first chamber, and
   a second portion partially defined by a torque converter clutch piston, the torque converter clutch piston also partially defining the second chamber.

4. The clutch assembly of claim 1, wherein the first chamber is a disconnect apply chamber, and the second chamber is a torque converter clutch apply chamber.

5. The clutch assembly of claim 1, further comprising a balance dam that partially defines the joint balance chamber, the balance dam defining a fourth passage that provides a fluid pathway from the joint balance chamber to a disconnect clutch pack.

6. The clutch assembly of claim 5, wherein the disconnect clutch pack is positioned radially outward from the fourth passage,
   the clutch assembly further comprising an electric motor arranged radially outward from the disconnect clutch pack, and the electric motor is in fluid communication with the fourth passage defined by the balance dam.

7. The clutch assembly of claim 5, wherein the fourth passage is formed as a plurality of scallops on the balance dam.

8. The clutch assembly of claim 1, wherein the hub defines a fluid pathway between the second passage of the input shaft and the second chamber.

9. The clutch assembly of claim 1, wherein the input shaft is fluidly isolated from the joint balance chamber.

10. The clutch assembly of claim 1, wherein the third passage in the hub is the only source of fluid to the joint balance chamber.

11. The clutch assembly of claim 1, wherein the third passage in the hub includes an orifice at an end connected to the joint balance chamber, and the orifice is smaller than an opening of the third passage connected to the charge pressure fluid circuit.

12. The clutch assembly of claim 11, wherein the orifice has a diameter of 3.0 mm-8.0 mm.

13. The clutch assembly of claim 1, wherein the hub is centered via engagement with a torque converter clutch piston, and axially positioned between a cover flange and a sealing plate.

14. The clutch assembly of claim 1, wherein the hub is directly radially adjacent to the input shaft.

15. A clutch assembly comprising:
   a joint balance chamber positioned between a disconnect apply chamber and a torque converter clutch apply chamber;
   a torque converter assembly including a charge pressure fluid circuit; and
   a hub defining a passage between the charge pressure fluid circuit and the joint balance chamber, such that fluid from the torque converter assembly is provided to the joint balance chamber.

16. The clutch assembly of claim 15, wherein the hub also defines a fluid pathway between a passage of an input shaft and the torque converter clutch apply chamber.

17. The clutch assembly of claim 15, wherein the passage in the hub is the only source of fluid to the joint balance chamber.

18. The clutch assembly of claim 15, wherein a first passage defined by an input shaft is configured to provide fluid to the disconnect apply chamber, and a second passage defined by the input shaft is configured to provide fluid to the torque converter clutch apply chamber.

19. The clutch assembly of claim 18, wherein the input shaft is fluidly isolated from the joint balance chamber.

20. The clutch assembly of claim 15, wherein the passage in the hub includes an orifice at an end connected to the joint balance chamber, and the orifice is smaller than an opening of the passage connected to the charge pressure fluid circuit.

* * * * *